June 12, 1923.
L. W. GREVE
1,458,698
PNEUMATIC GREASE GUN
Filed Nov. 11, 1918
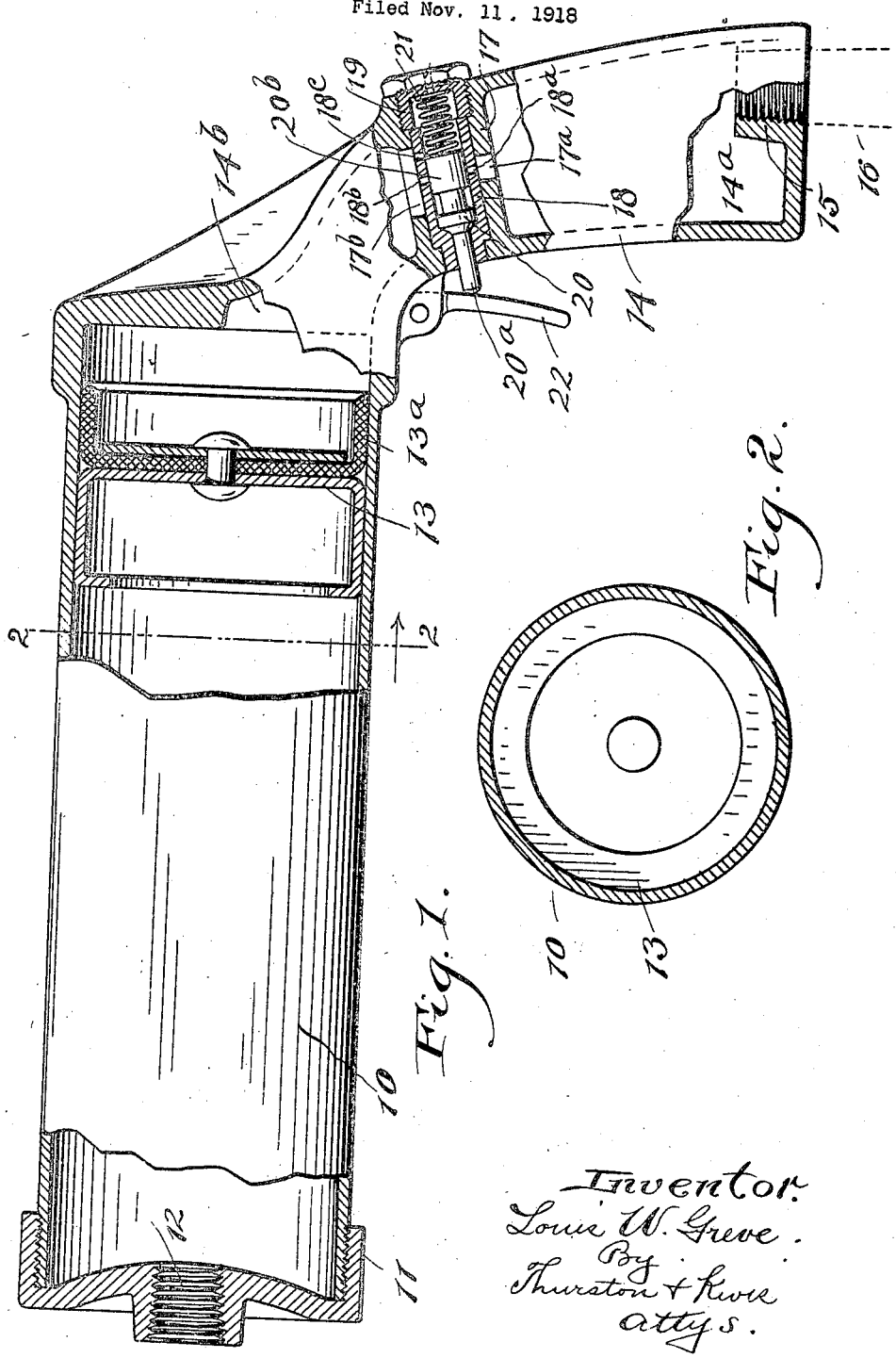
Inventor
Louis W. Greve.
By
Thurston & Kwis
attys.

Patented June 12, 1923.

1,458,698

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

PNEUMATIC GREASE GUN.

Application filed November 11, 1918. Serial No. 261,991.

*To all whom it may concern:*

Be it known that I, LOUIS W. GREVE, a citizen of the United States, residing at Cleveland, in the county of Cuyahoga and State of Ohio, have invented a certain new and useful Improvement in Pneumatic Grease Guns, of which the following is a full, clear, and exact description.

This invention relates to what may be termed a pneumatic grease gun, the chief object of which is to provide a grease injecting device from which grease is expelled by air pressure.

Further the invention aims to provide a device of this character having a barrel or chamber from which the grease is ejected by the action of an air impelled plunger or piston, together with means for controlling the action of the piston so as to instantly stop as well as start it in motion and thereby prevent more than the desired amount of piston movement by the expansion of the air behind the piston after the supply port has been closed.

Still further the invention aims to provide a device of this character with a valve adapted to control both the admission to and exhaust of air from the piston chamber, and arranged in such a manner that it can be conveniently and quickly actuated.

The above and other objects are attained by my invention which may be briefly summarized as consisting in certain novel details of construction and combinations and arrangements of parts which will be described in the specification and set forth in the appended claims.

In the accompanying sheet of drawings, Fig. 1 is a side view of the grease gun with parts in section; and Fig. 2 is a transverse sectional view along the line 2—2 of Fig. 1.

Referring now to the drawings, 10 represents a cylinder or barrel into which a quantity of lubricating grease is adapted to be supplied, this barrel having screwed onto its forward end a removable cap 11, which is removed when it is desired to fill the barrel, this cap being provided at the center with an outlet opening 12, which as here shown, is screw-threaded on the interior so that it may be attached to the part that receives the grease, as for example, the body or chamber of an ordinary grease cup. Of course, if desired, the grease may be conveyed to the part or parts to receive it, by an intermediate conveying tube or pipe which may be attached to the front end of the barrel.

The grease is expelled from the barrel through the discharge opening 12, pneumatically, and to this end the barrel is provided with a piston or plunger 13, behind which air under pressure is adapted to be admitted. The piston as here shown, is in the form of a forwardly facing cup, to the rear side of which is held suitable packing $13^a$.

Although in the broad aspects of the invention I do not now regard it essential that the manipulating or controlling end of the gun be shaped as here shown, I prefer that the gun be handled or manipulated through the medium of a part 14, approximating the shape of a revolver grip. Preferably the grip 14 not only serves as a means for handling and operating the grease gun, but is utilized for the transmission of compressed air to the chamber behind the piston, and is preferably provided also with a controlling valve. To this end the grip is made hollow, and in the butt of the grip I provide a threaded flanged opening 15, into which may be screwed the end 16 of an air supply pipe, tube, or a suitable coupling member therefor.

Also between the ends of the handle or grip I provide a valve chamber 17, between the pressure side $14^a$ of the hollow grip and the cylinder or barrel side $14^b$, which communicates directly with the rear end of the barrel, the grip being preferably cast integral with the barrel so as to form an integral part therewith. In this instance, the valve chamber is provided with two diametrically opposite ports $17^a$ and $17^b$, the former communicating with the pressure chamber $14^a$, and the latter with the chamber $14^b$ leading to the barrel, and the valve chamber receives a bushing 18 which is held in place by a nut 19, screwed into the outer or rear side of the grip, and provided with a central exhaust port $19^a$. In this case, the inner end of the bushing is reduced and extends through an opening on the inner side of the grip.

Mounted in this bushing is an endwise movable piston valve 20 which is pressed inwardly toward the inner side of the grip by a spring 21, between the nut 19 and the valve. The inner end of the valve is reduced to the form of a pin 20ª, which projects through the inner side of the grip so that it may be engaged and moved inwardly by a valve actuating member 22, here shown in the form of a fire-arm trigger.

The outer part of the valve, i. e. the end next to the spring 21 is enlarged, as shown at 20ᵇ, this part having a fairly close working fit in the bushing, and controlling the ports to be referred to.

The bushing in this instance is provided with three air ports, including two diametrically opposite ports 18ª and 18ᵇ which are normally closed by the valve and communicate respectively with the opening 17ª of the chamber leading to the pressure side, and the opening 17ᵇ of the chamber leading to the space behind the piston, these two ports constituting the ports which admit air to the cylinder of the gun. The third port 18ᶜ, is an exhaust port which is normally open, this port, which communicates with the opening 17ᵇ of the chamber being at the side of the port 18ᵇ, but normally located just beyond the outer end of the valve when it is in its normal position, this port serving to exhaust the air from behind the piston when the valve is restored to normal position, by allowing it to escape, in this instance, through the central outlet opening 19ª of the nut.

It will be observed that when the valve is in the position shown, the piston or plunger 13 is stationary, since the flow of air behind the same is shut off by the valve. However, when the operator grasps the grip, and with his finger pulls the trigger inwardly toward the grip, the valve is shifted endwise, and the inlet ports 18ª and 18ᵇ are uncovered and simultaneously the exhaust port 18ᶜ is covered. This allows air under pressure to pass through the grip to the space behind the piston so as to force it forwardly to eject the grease from the barrel. As soon as the desired amount of grease is ejected, the operator releases his finger from the trigger, and immediately the valve is restored by the spring to normal position, closing the supply ports, and opening the exhaust port so that the pressure behind the piston is almost instantly reduced to atmospheric pressure. This exhausting of air from behind the piston when the valve is closed, is of prime importance, for if the air supply were merely shut off, without any provision for reducing the pressure behind the piston, the expansion of the compressed air trapped between the piston and the valve would cause a continued forward movement of the piston and the ejection of more grease than would be desired or necessary.

When the barrel has been emptied of grease, the cap 11 is removed and the barrel is recharged, the grease forcing the piston back to the rear end of the barrel.

Should the resistance afforded by the grease, and the closeness of the fit between the piston and the barrel be insufficient to prevent a too rapid forward movement of the piston, the forward movement of the latter may be retarded if desired, by a coil spring fitting inside the barrel and arranged between the cap 11 and the forward end of the piston.

A device of this character has a very wide field of use, but has particular utility in initially forcing grease through the passageways and around the parts to be lubricated of a newly constructed machine, such as an automobile, the initial and effective lubrication of which at times is a difficult or a laborious matter.

While I have shown the preferred construction, I do not desire to be confined to the precise details shown, but aim in my claims to cover all modifications which do not involve a departure from the spirit and scope of my invention in its broadest aspects.

Having described my invention, I claim:

1. In a lubricating device of the character described, a barrel adapted to be filled with lubricant and provided at its forward end with a discharge opening, and a piston adapted to be moved lengthwise of the barrel under air pressure, said barrel having at its rear end a hollow grip forming a continuation of the barrel to which an air supply member is adapted to be connected, said grip being provided with a valve between the point of supply of the air and the barrel, said valve comprising a valve chamber, a movable valve member, and inlet and exhaust ports through which air is supplied to or exhausted from the barrel.

2. In a lubricating device, a barrel adapted to be filled with lubricant and provided at its forward end with a discharge opening, a piston adapted to be moved lengthwise of the barrel under air pressure, said barrel having at its rear end a hollow grip forming a continuation of the barrel to which an air supply member is adapted to be connected, a valve mounted in said grip comprising a valve chamber, and a movable valve member therein, said valve member in one position thereof being adapted to provide an exhaust passage from said barrel and in its other position to provide a passage from said air supply to said barrel, means for normally holding said valve member in exhaust position, and a trigger mounted on said grip adapted to be operated to shift said valve into position to admit air from said air supply member to said barrel.

In testimony whereof, I hereunto affix my signature.

LOUIS W. GREVE.